Patented Oct. 26, 1948

2,452,416

UNITED STATES PATENT OFFICE 2,452,416

PROCESS OF MAKING DIMETHYL SILICONE PRODUCTS

James G. E. Wright, Alplaus, N. Y., assignor to General Electric Company, a corporation of New York No Drawing. Application April 26, 1944, Serial No. 532,879

8 Claims. (Cl. 260—448.2)

The present invention relates to dimethyl silicone products and to a process of making dimethyl silicones of high molecular weight. It is particularly concerned with a process of hydrolyzing a dimethyldihalogenosilane, e. g. dimethyldichlorosilane, dimethyldibromosilane, etc., to obtain a hydrolysis product composed substantially of dimethyl silicones boiling above 200 deg. C. Specifically, it is concerned with the preparation of dimethyl silicones for the manufacture of silicone elastomers such as are described herein and in the copending application of Maynard C. Agens, Serial No. 526,473 and the copending application of James G. E. Wright and C. S. Oliver, Serial No. 526,472, both of which applications were filed March 14, 1944, now U. S. Patents No. 2,448,756 and No. 2,448,565, respectively, and assigned to the same assignee as the present invention.

The hydrolysis of a dimethyldihalogenosilane such as dimethyldichlorosilane is most readily carried out by pouring it into water. The product of hydrolysis, polymeric dimethyl silicone, is an oily liquid which floats on the surface of the other product of hydrolysis, hydrochloric acid, and can be separated from the acid by decantation. In general, dimethyl silicone prepared by this procedure contains a large proportion of the tetramer, octamethylcyclotetrasiloxane, boiling at 175 deg. C., along with lesser amounts of trimer boiling at 134 deg., pentamer, boiling at 210 deg. C., and others. From a third to a half of the total product may be distilled at about 200 deg. C. or below, and is thus comparatively volatile.

An object of the present invention is to provide a method of hydrolysis of a dimethyldihalogenosilane of the type described in the above-mentioned applications which yields a polymeric dimethyl silicone of high molecular weight and containing a minimum of polymers boiling below 200 deg. C. The product obtained is generally a viscous liquid, but under some circumstances an elastic gum is obtained. In accordance with my invention, these high molecular weight silicones are obtained by employing as the hydrolysis medium a solid inorganic substance containing water of crystallization, water of hydration, or "bound" water. No liquid water is employed.

In general, the materials which are suitable for my hydrolysis medium are members of the class consisting of hydrated inorganic salts in which the anion is unpolymerized, and metal hydrates (hydoxides) other than the hydroxides of the alkali and alkaline earth metals. Examples of such materials are cupric hydroxide, ferric chloride hexahydrate, ferric sulphate heptahydrate, cupric sulphate pentahydrate, cupric chloride dihydrate, lead hydroxide, sodium carbonate trihydrate, sodium carbonate heptahydrate, sodium sulphate decahydrate, aluminum hydrate, stannic chloride pentahydrate, manganese chloride tetrahydrate, calcium nitrate hexahydrate, cobalt nitrate tetrahydrate, hydrated silicagel, etc.

In carrying out my invention, it is only necessary to pour the dimethyldihalogenosilane, for example, dimethyl dichlorosilane, onto the solid crystals or powder. As the hydrolysis proceeds, due to the reaction between the chlorosilane and the water, the reacting mass generally separates into two liquid layers with a saturated solution of the salt, or its reaction product with the hydrogen halide below and the viscous oily layer above. On standing, the oily layer is frequently converted into an elastic gum, particularly when the hydrolysis medium comprises compounds of iron, and occasionally when the sulphates of sodium and copper are employed. At the end of the reaction it is only necessary to separate the upper layer of silicone from the lower layer of solution, or excess salt. The product may then be further washed with water, if desirable or necessary, to remove adsorbed or adhering portions of the hydrolysis medium.

The dimethyl silicone obtained by the method of hydrolysis described above is of very high molecular weight as compared with that obtained by hydrolysis in water or aqueous solutions and contains only a small quantity of material boiling below 200 deg. C., generally less than 10 per cent.

As has been previously stated, the dimethyl silicones prepared in accordance with the present invention are particularly adapted for use in the manufacture of silicone elastomers as described in the Agens and Wright et al. applications referred to hereinbefore. When a hydrolysis medium such as hydrated silica is employed as the hydrolysis medium all or part of the medium may be allowed to remain in the dimethyl silicone as a filler for the elastomer prepared therefrom. A hydrated silica gel prepared by treating a solution of water-glass with hydrochloric acid, washing the product free from acid and NaCl, and air-drying the product at room temperature, had a composition corresponding approximately to $SiO_2 \cdot 12H_2O$. This gel was used to hydrolyze dimethyldichlorosilane. A buttery mass resulted. It was placed in the dough mixer with a small amount of benzoyl peroxide. During mixing, the mass became soupy, then tough, and then elastic. Adjustment of the filler content of the elastomer can be obtained by adding more finely-divided silica or other filler or by addition of a dimethyl silicone gum prepared, for example, by use of one of the other hydrolysis mediums mentioned hereinbefore which produces soluble byproducts.

What I claim as new and desire to secure by Letters Patent of the United States, is:

1. The process of hydrolyzing a liquid dimethyldihalogenosilane which comprises (1) pouring the said dimethyldihalogenosilane onto a hydrolysis medium consisting of a finely-divided, solid, inorganic compound selected from the class consisting of hydrated inorganic salts in which the anion is unpolymerized, and metal hydroxides other than the hydroxides of the alkali and alkaline-earth metals, thereby to produce an aqueous phase and an oily phase containing the methylpolysiloxane hydrolysis product, and (2) recovering the methylpolysiloxane hydrolysis product.

2. The process of hydrolyzing liquid dimethyldichlorosilane which comprises (1) pouring the said liquid dimethyldichlorosilane onto a hydrolysis medium consisting of a finely-divided, solid, inorganic compound selected from the class consisting of hydrated inorganic salts in which the anion is unpolymerized, and metal hydroxides other than the hydroxides of the alkali and alkaline-earth metals, thereby to produce an aqueous phase and an oily phase containing the methylpolysiloxane hydrolysis product, and (2) recovering the methylpolysiloxane hydrolysis product.

3. The process of preparing a high molecular weight liquid dimethyl polysiloxane which comprises (1) pouring a liquid dimethyldihalogenosilane onto a hydrolysis medium consisting of a finely-divided, solid, hydrated, inorganic salt in which the anion is unpolymerized, thereby to produce an aqueous phase and an oily phase containing the methylpolysiloxane hydrolysis product, and (2) recovering the methylpolysiloxane hydrolysis product.

4. The process of preparing a high molecular weight liquid dimethyl polysiloxane which comprises (1) pouring a liquid dimethyldihalogenosilane onto a hydrolysis medium consisting of a finely-divided, solid metal hydroxide other than the hydroxides of the alkali and alkaline-earth metals, thereby to produce an aqueous phase and an oily phase containing the methylpolysiloxane hydrolysis product, and (2) recovering the methylpolysiloxane hydrolysis product.

5. The process of preparing a high molecular weight liquid dimethyl polysiloxane which comprises (1) pouring a liquid dimethyldihalogenosilane onto a hydrolysis medium consisting of a finely-divided, solid, hydrated iron halide, thereby to produce an aqueous phase and an oily phase containing the methylpolysiloxane hydrolysis product, and (2) recovering the methylpolysiloxane hydrolysis product.

6. The process of preparing a high molecular weight liquid dimethyl polysiloxane which comprises (1) pouring liquid dimethyldichlorosilane onto a hydrolysis medium consisting of finely-divided, solid ferric chloride hexahydrate, thereby to produce an aqueous phase and an oily phase containing the methylpolysiloxane hydrolysis product, and (2) recovering the methylpolysiloxane hydrolysis product.

7. The process of preparing a high molecular weight liquid dimethyl polysiloxane which comprises (1) pouring a liquid dimethyldihalogenosilane onto a hydrolysis medium consisting of a finely-divided, hydrated sodium carbonate, thereby to produce an aqueous phase and an oily phase containing the methylpolysiloxane hydrolysis product, and (2) recovering the methylpolysiloxane hydrolysis product.

8. The process of preparing a high molecular weight liquid dimethyl polysiloxane which comprises (1) pouring liquid dimethyldichlorosilane onto a hydrolysis medium consisting of finely-divided sodium carbonate decahydrate, thereby to produce an aqueous phase and an oily phase containing the methylpolysiloxane hydrolysis product, and (2) recovering the methylpolysiloxane hydrolysis product.

JAMES G. E. WRIGHT.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,306,222 | Patnode | Dec. 22, 1942 |
| 2,388,299 | Thielemann | Nov. 6, 1945 |
| 2,412,470 | Norton | Dec. 2, 1946 |

FOREIGN PATENTS

| Number | Country | Date |
|---|---|---|
| 113,708 | Australia | Sept. 4, 1941 |

OTHER REFERENCES

Mark, Physical Chemistry of High Polymeric Systems, Interscience, N. Y., 1940, pp. 169 and 170.

Ford-Dana, A text book of Mineralogy 4th ed., Wiley, 1932, p. 659.